United States Patent

[11] 3,607,056

[72] Inventors Nerses H. Krikorian;
  Angelo L. Giorgi; Eugene G. Szklarz;
  Milton C. Krupka, all of Los Alamos, N. Mex.
[21] Appl. No. 864,557
[22] Filed Oct. 7, 1969
[45] Patented Sept. 21, 1971
[73] Assignee The United States of America as represented by the United States Atomic Energy Commission

[54] PREPARATION OF A SUPERCONDUCTING SCANDIUM-CARBON PHASE
  3 Claims, No Drawings
[52] U.S. Cl. .................................................. 23/208A, 252/516, 252/521
[51] Int. Cl. ........................................................ C01f 17/00
[50] Field of Search ............................................ 23/208 A; 252/516, 521

[56] References Cited
UNITED STATES PATENTS
3,482,940 12/1969 Krupka et al. ................ 23/208 A OTHER REFERENCES
"Journal American Chemical Society," vol. 80, pp. 4499–4503 (1958)

Primary Examiner—Oscar R. Vertiz
Assistant Examiner—G. O. Peters
Attorney—Roland A. Anderson ABSTRACT: A method of preparing a superconducting body-centered cubic scandium carbide phase having the approximate composition $Sc_{13}C_{10}$ which comprises arc-melting scandium and carbon in the presence of small quantities of germanium and then annealing at temperatures above 1,000° and below 1,600° C.

PREPARATION OF A SUPERCONDUCTING SCANDIUM-CARBON PHASE

The invention described herein was made in the course of, or under contract with the U.S. ATOMIC ENERGY COMMISSION.

This invention relates to the field of superconductors.

In now U.S. Pat. No. 3,482,940, (issued Dec. 9, 1969) the present inventors disclose a method of preparing stable body-centered cubic yttrium sesquicarbide that is superconducting. They also disclose that a body-centered cubic lanthanum sesquicarbide normally prepared by arc-melting is also superconducting. In U.S. Pat. application Ser. No. 843,224 (filed July 18, 1969) they further disclose that the addition of small amounts of certain other metals to form a ternary sesquicarbide produced by the method of U.S. Pat. 3,482,940 significantly raises the superconducting transition temperatures for both lanthanum and yttrium sesquicarbide.

The inventors have now discovered a method of preparing a body-centered cubic scandium carbide phase that is also superconducting. This is believed to be the first reported occurrence of superconductivity in the scandium-carbon system.

Body-centered scandium carbide having the composition $Sc_4C_3$ can be prepared by arc-melting and annealing but exhibits no superconducting transition down to 1° K. However, the addition of small amounts of germanium to the arc melt followed by annealing produces a new body-centered cubic scandium-carbide phase having the approximate composition $Sc_{13}C_{10}$. This latter carbide is superconducting with the transition temperature ranging from 7.0° K. to 8.5° K.

It is therefore an object of this invention to provide a novel method for preparing a body-centered cubic scandium-carbide phase that is superconducting.

Other objects and advantages of this invention will be apparent from the following description of the preferred embodiment.

An arc-melted material of nominal composition $ScC_{0.75}Ge_{0.02}$ to $ScC_{0.75}Ge_{0.10}$ is annealed at temperatures above 1,000° C. and below 1,600° C. to form body-centered cubic $Sc_{13}C_{10}$. Highest yields are obtained by heating at 1,300° C.–1,400° C. for 6 hours or more. Alternatively, the $Sc_{13}C_{10}$ can be prepared more rapidly by annealing for 5–15 minutes in the temperature interval 1,125° C.–1,350° C. at 15–25 kbars pressure.

Annealing conditions and results for various Sc-C-Ge compositions are shown in the following table.

| Nominal composition | Heating time, hours | Conditions, temperature, ° C. | Lattice parameters of b.c.c. phases $Sc_4C_3$ | Lattice parameters of b.c.c. phases $Sc_{13}C_{10}$ | Trans, temperature, ° C. |
|---|---|---|---|---|---|
| $ScC_{.75}Ge_{.01}$ | 21 | 1,300 | 7.2078±3 | 8.522±2 | 7.2 |
|  | 115 | 1,300 | 7.214±4 |  | (¹) |
|  | 3 | 1,450 | 7.205±3 |  | (¹) |
| $ScC_{.75}Ge_{.02}$ | 16 | 1,300 |  | 8.5283±5 | 8.5 |
|  | 105 | 1,100 | 7.205±2 | 8.514±2 | 8.5 |
| $ScC_{.75}Ge_{.04}$ | 26 | 1,175 | 7.2056±4 | 8.5260±8 | 7.8 |
| $ScC_{.75}Ge_{.04}$ plus | 2 | 1,370 |  | 8.5260±4 | 8.5 |
|  | 2 | 1,470 |  | 8.5263±3 | 8.5 |
|  | 2 | 1,650 | No identifiable phases |  | (¹) |
|  | 168 | 1,050 |  | 8.5311±11 | 8.5 |
|  | 6 | 1,370 |  | 8.5266±4 | 8.5 |
| $ScC_{.75}Ge_{.08}$ | 17 | 1,300 |  | 8.5286±6 | 8.0 |
| $ScC_{.75}Ge_{.10}$ | 19 | 1,300 |  | 8.5271±7 | 8.1 |
| $ScC_{.75}Ge_{.10}$ plus | 29 | 1,050 |  | 8.5302±7 | 7.9 |
|  | 4 | 1,600 | No identifiable phases |  | (¹) |
| $ScC_{.75}Ge_{.12}$ | 16 | 1,300 |  |  |  |
| $ScC_{.75}Ge_{.16}$ | 19 | 1,000 | No identifiable phases |  | (¹) |
|  | 19 | 1,300 |  |  |  |
| $ScC_{.75}Ge_{.16}$ plus | 16 | 1,600 |  |  |  |
| $ScC_{.87}Ge_{.04}$ | 17 | 1,300 |  | 8.5286±9 | 8.2 |
| $ScC_{.64}Ge_{.05}$ | 17 | 1,300 |  | 8.5259±3 | 7.0 |
| $ScC_{.67}Ge_{.08}$ | 18 | 1,300 |  | 8.5276±5 | 8.1 |
| $ScC_{.58}Ge_{.08}$ | 18 | 1,300 | 7.203±2 | 8.524±3 | 7.0 |
| $ScC_{.50}Ge_{.08}$ | 20 | 1,300 | 7.205±2 | 8.514±3 | 7.0 |
| $ScC_{.70}Ge_{.03}$ ² | 18 | 1,300 |  | 8.5268±4 | 7.8 |

¹ No superconducting transition observed for measurements down to 4.0° K.
² Analyzed composition.

The appearance of the work "plus" in the table indicates that the particular composition has been annealed at a specified temperature for a specified time, then undergone an additional annealing for an additional time at a different temperature as specified.

The body-centered cubic $Sc_{13}C_{10}$ phase appears to be stable only over a limited temperature range. Below 1,000° C., it does not form, whereas it is destroyed at 1,600° C. and above. However, as the data for composition $ScC_{0.75}Ge_{0.04}$ indicate, the cell can be reformed by further annealing at a lower temperature. Once formed in the matrix the phase is readily quenched in by normal cooling techniques. Further, if the germanium content of the arc melt exceeds 0.10, the phase will not form. The fact that large variations in germanium concentrations show no corresponding change in lattice parameters suggests that the germanium is not part of the structure and the superconducting phase is a binary compound (i.e., $Sc_{13}C_{10}$).

What we claim is:

1. A method of preparing a superconducting body-centered cubic scandium-carbide phase comprising annealing at a temperature above 1,000° C., but below 1,600° C., an arc melted material of nominal composition $ScC_{0.75}Ge_x$ where x is in the range of 0.02–0.10.

2. The method of claim 1 where the annealing temperature is 1,300° C.–1,400° C. and the annealing time is 6 hours or more.

3. The method of claim 1 where the annealing temperature is 1,125° C.–1,350° C., the annealing time is 5–15 minutes, and the annealing is done at 15–25 kbars pressure.